US007632198B2

(12) United States Patent
Lee

(10) Patent No.: US 7,632,198 B2
(45) Date of Patent: Dec. 15, 2009

(54) BASKETBALL GAME OFFENSE LIMIT TIME TIMER CONTROLLER

(76) Inventor: Man Bok Lee, 103-1001, YoonChang APT., 633-67 Haengsin-dong, Deogyang-gu, Goyang-si, Gyeonggi-do 412-824 (KR)

( * ) Notice: Subject to any disclaimer, the term of this patent is extended or adjusted under 35 U.S.C. 154(b) by 484 days.

(21) Appl. No.: 11/047,783

(22) Filed: Feb. 1, 2005

(65) Prior Publication Data

US 2005/0185511 A1 Aug. 25, 2005

(30) Foreign Application Priority Data

Feb. 2, 2004 (KR) ..................... 20-2004-0002457

(51) Int. Cl.

*A63F 9/24* (2006.01)
*A63F 13/00* (2006.01)
*G06F 17/00* (2006.01)
*G06F 19/00* (2006.01)

(52) U.S. Cl. .............. 473/472; 340/309.16; 340/323 R; 368/3; 368/10; 368/107; 715/716

(58) Field of Classification Search ................. 473/472; 368/3; 340/323 R; 116/222
See application file for complete search history.

(56) References Cited

U.S. PATENT DOCUMENTS

| | | | | |
|---|---|---|---|---|
| 4,045,788 | A * | 8/1977 | Castelli et al. | 340/323 R |
| 5,294,913 | A * | 3/1994 | Mower et al. | 340/323 R |
| 5,341,121 | A * | 8/1994 | Rada | 340/323 R |
| 5,898,587 | A * | 4/1999 | Bell et al. | 700/92 |
| 6,816,130 | B1 * | 11/2004 | Shishido et al. | 345/2.3 |
| 6,816,442 | B1 * | 11/2004 | Heiman et al. | 368/107 |
| 7,031,225 | B2 * | 4/2006 | McDonald | 368/10 |
| 7,057,975 | B2 * | 6/2006 | Stobbe | 368/3 |
| 7,289,016 | B2 * | 10/2007 | Luebke et al. | 340/309.16 |
| 2003/0054905 | A1 * | 3/2003 | King, Jr. | 473/467 |
| 2005/0240872 | A1 * | 10/2005 | Roeske | 715/716 |

* cited by examiner

*Primary Examiner*—John M. Hotlaing, II
*Assistant Examiner*—Paul A. D'Agostino
(74) *Attorney, Agent, or Firm*—Ladas & Parry LLP

(57) ABSTRACT

A controller for controlling a timer for measuring offense limit time in a basketball game is provided, in which offense limit time is continuously displayed on an offense limit time display when game remaining time is left less than twenty-four seconds, to thereby allow players to play the basketball game and spectators to see the basketball game more dynamically as well. The controller includes: a main controller which operates according to an input signal from a microprocessor, a game time switch manipulator, or an offense limit time switch manipulator, judges whether the game remaining time is left equal to or more than twenty-four seconds, or less than twenty-four seconds, allows the input signal from the microprocessor, the game time switch manipulator, or the offense limit time switch manipulator if the game remaining time is left equal to or more than twenty-four seconds in the judgement result, and blocks the input signal from the microprocessor, the game time switch manipulator, or the offense limit time switch manipulator if the game remaining time is left less than twenty-four seconds in the judgement result; and an output terminal which interfaces with the main controller, and transfers the offense limit time to a basketball game remaining time electronic signboard on which the basketball game remaining time is continuously displayed, according to a control signal from the main controller, in the case that the game remaining time is left less than twenty-four seconds.

1 Claim, 7 Drawing Sheets

BASKETBALL GAME OFFENSE LIMIT TIME TIMER CONTROLLER

BACKGROUND OF THE INVENTION

1. Field of the Invention

The present invention relates to an offense limit time display window on a basketball game remaining time electronic signboard, and more particularly, to a controller for controlling a timer for measuring offense limit time in a basketball game, in which offense limit time is continuously displayed on an offense limit time display when game remaining time is left less than twenty-four seconds, to thereby allow players to play the basketball game and spectators to see the basketball game more dynamically as well.

2. Description of the Related Art

In general, an organized basketball game has two teams consisting of five players each. The team that has the ball is the offense and the opposing team becomes the defense. The offense has to get the ball through the opposing team's basket as much as possible by passing or dribbling a ball effectively, and the defense has to stop them from doing so. That's basketball rule in a nutshell. The offense positions the players to take a shot, that is, throw the ball through the hoop. In the defense positions players block these shots.

Basketball originated from America is a sport of agility and endurance that develops hand-eye coordination. Dr. James Naismith of Ontario, Canada invented the basketball game in 1891. He contrived the basketball game which can be played indoors even in the rainy days or winter seasons. He set up five principles and thirteen rules, taking field games such as the American football, soccer, ice or field hockey, etc. That is, the basketball game was invented according to the following conditions: 1) a light ball which is of a size sufficient to handle it by the hand or hands of the player is used; 2) the players should not run while holding the ball but can run while passing or dribbling the ball; 3) Any players can handle the ball anytime during playing the game; 4) the players can be positioned any place in the court, but should not touch the other team's players; and 5) the game post should be installed horizontally at an appropriately high position from the bottom of the court.

By the basketball rule, there are a youth basketball game of which duration has forty minutes having two 20-minute halves, with a running clock, a professional basketball game of which duration is divided into four quarters, for forty minutes each quarter being ten minutes, etc.

Also, there is a 30-second or 24-second violation rule, in which each basketball team must attempt a shot within 30 or 24 seconds, which otherwise result in a change of possession of the ball.

Thus, since the 30-second or 24-second shot clock was the most exciting change in the basketball game, in which a team now got 24 seconds to take a shot or else lose the possession of the ball, all basketball players should see a timer which is installed in the upper portion or the rear wall of the basketball court frequently, in order to check how much remaining time of the game is left, in particular, in order to use offense limit time in the offense positions, even in the case that the players play the game according to the playing strategy, that is, even in the tense situations of playing the game with the five players in one team jointed together.

FIG. 1 is a schematic diagram showing a system for driving an electronic signboard on which basketball game remaining time is displayed, and FIG. 2 is a perspective view showing the electronic signboard of FIG. 1 on which basketball game remaining time is displayed is installed in the upper side of the basketball game post.

As shown in FIGS. 1 and 2, a conventional system for driving an electronic signboard on which basketball game remaining time is displayed, includes a basketball game remaining time electronic signboard 14 which is installed in the upper portion of a basketball game post 13, so that players who play a basketball game see times displayed on a game remaining time display 10 and an offense limit time display 12 and thus recognize the game remaining time and the offense limit time. Also, the conventional electronic signboard driving system includes a main electronic signboard (not shown) which is installed so that spectators can visually recognize various data such as game remaining time, offense limit time, scores, the names of players, etc. Also, the conventional electronic signboard driving system includes a game management computer 16 having a memory and output unit which stores the various data such as the game remaining time, offense limit time, scores, the names of players, etc., and outputs the same to the main electronic signboard. Also, the conventional electronic signboard driving system includes an offense limit time dedicated controller 20 having a memory, a switching unit and a liquid crystal display in order to designate offense limit time varying over time on the basketball game remaining time electronic signboard 14 and the main electronic signboard, and having an information transmission and reception dedicated connector 18 which shares the designated offense limit time with an external unit (not shown) in the outside of the housing of the offense limit time dedicated controller 20. Also, the conventional electronic signboard driving system includes a game remaining time dedicated controller 22 which is electrically connected with the connector 18 which is installed in the outside of the offense limit time dedicated controller 20 via a separate cable, and receives the designated offense limit time from the offense limit time dedicated controller 20 so as to be displayed on the basketball game remaining time electronic signboard 14 and the main electronic signboard, and having a memory, a switching unit and a liquid crystal display in order to designate the game remaining time to the basketball game remaining time electronic signboard 14, and to directly output the game remaining time on the basketball game remaining time electronic signboard 14 when the game management computer 16 is turned off.

Here, the game remaining time display 10 in the basketball game remaining time electronic signboard 14 is much smaller than the offense limit time display 12 therein.

A restart switch, a start switch, a stop switch, and a reset switch are installed in the front surface of the offense limit time dedicated controller 20. Also, a toggle switch for setting offense limit time for an amateur or professional basketball game is positioned in the upper portion of the offense limit time dedicated controller 20. Also, a connector for a power supply, and a connector for data transmission are installed in one side of the rear surface of the offense limit time dedicated controller 20.

The start switch is used for triggering offense limit time. The restart switch is used for continuously newly setting offense limit time. The stop switch is used when the game is interrupted by timeouts or breaks to thus have no need to set offense limit time. The reset switch is used for renewing the basketball game electronic signboard driving system.

The toggle switch is shifted from an amateur mode to a professional mode and vice versa once it is pressed. At present, there are a 30-second and 24-second violation rules. Since offense limit time is 30 seconds in the amateur basketball game mode, each basketball team must attempt a shot within 30 seconds, which otherwise result in a change of possession of the ball. Since offense limit time is 24 seconds in the professional basketball game mode, each basketball team must attempt a shot within 24 seconds, which otherwise result in a change of possession of the ball.

Also, on one side of the upper portion of the offense limit time dedicated controller 20 is positioned a display on which designated offense limit time is displayed in real-time. Also, a separate power switch and a fuse are installed on the front surface of the offense limit time dedicated controller 20.

Meanwhile, on the front surface of the game remaining time dedicated controller 22 are a buzzer switch, a reset switch, a stop switch, a start switch, and an indicator lamp, together with a time setting switch and a display.

Also, a power switch is installed in the game remaining time dedicated controller 22. Also, a switch turning on of off the game remaining time dedicated controller 22, and a switch inducing the offense limit time dedicated controller 20 to be turned on, are installed in the game remaining time dedicated controller 22. Also, a fuse is installed at a proper place in the game remaining time dedicated controller 22.

The basketball game remaining time electronic signboard having the above-described structure outputs various information such as introduction of players, scores, and game remaining time, on the main electronic signboard by the game management computer 16 so that spectators can see the various information displayed on the main electronic signboard.

Also, the game management computer 16 transmits the signal for the game remaining time to the game remaining time display 10 provided in the basketball game remaining time electronic signboard 12 which is installed in the upper portion of the basketball game post 13, via the game remaining time dedicated controller 22, so that the game remaining time is displayed on the game remaining time display 10 in real-time in synchronization with the main electronic signboard.

Meanwhile, when an operational signal is applied in the offense limit time dedicated controller 20, it is transmitted to the main electronic signboard and the offense limit time display 12 provided in the basketball game remaining time electronic signboard 14, respectively, so that the remaining offense limit time can be recognized by both the players and spectators.

To do so, the output signal from the offense limit time dedicated controller 20 should be transmitted to the basketball game remaining time dedicated controller 22. The output signal from the offense limit time dedicated controller 20 is transmitted to both the offense limit time display 12 provided in the basketball game remaining time electronic signboard 14 and the main electronic signboard, so as to be easily recognized by both the players and spectators.

However, as shown in FIG. 3, in the case that game remaining time is left less than 24 seconds on the game remaining time display 10 in the basketball game remaining time electronic signboard 14, a 24=second timer is turned off according to a control signal output from the game remaining time dedicated controller 22, and thus no offense limit time is displayed on the offense limit time display 12 provided in the basketball game remaining time electronic signboard 14.

Accordingly, the players or spectators should see the game remaining time display 10 which is a small display installed in the upper side of the basketball game post, or the main electronic signboard installed at a remote place from the basketball game court, and play the game.

As a result, umpires or game operation personnel should inform the players or spectators of the remaining offense limit time manually.

In the case of an evenly-matched contest, a failure to see the game remaining time accurately may cause losing of the game which otherwise may be won.

Thus, players cannot be indulged on the game and play the game more vividly, which may cause a number of spectators who enjoy seeing basketball games to be reduced.

SUMMARY OF THE INVENTION

To solve the above problems, it is an object of the present invention to provide a controller for controlling a timer for measuring offense limit time in a basketball game, in which offense limit time is continuously displayed on an offense limit time display when game remaining time is left less than twenty-four seconds, to thereby allow players to play the basketball game and spectators to see the basketball game more dynamically as well.

To accomplish the above object of the present invention, there is provided a controller for controlling a timer for measuring offense limit time in a basketball game, for use in a basketball game remaining time controller including an external game time input unit which inputs game time or offense limit time via a microprocessor, a game time switch manipulator which inputs or stops game time manually at the time when the external game time input unit is out of order, and an offense limit time switch manipulator which inputs or stops offense limit time, the offense limit time timer controller comprising: a main controller which operates according to an input signal from a microprocessor, a game time switch manipulator, or an offense limit time switch manipulator, judges whether the game remaining time is left equal to or more than twenty-four seconds, or less than twenty-four seconds, allows the input signal from the microprocessor, the game time switch manipulator, or the offense limit time switch manipulator if the game remaining time is left equal to or more than twenty-four seconds in the judgement result, and blocks the input signal from the microprocessor, the game time switch manipulator, or the offense limit time switch manipulator if the game remaining time is left less than twenty-four seconds in the judgement result; and an output terminal which interfaces with the main controller, and transfers the offense limit time for the display on which the basketball game remaining time is continuously displayed, according to a control signal from the main controller, in the case that the game remaining time is left less than twenty-four seconds.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE INVENTION

A basketball game offense limit time timer controller according to a preferred embodiment of the present invention will be described with reference to the accompanying drawings.

Figure 1:
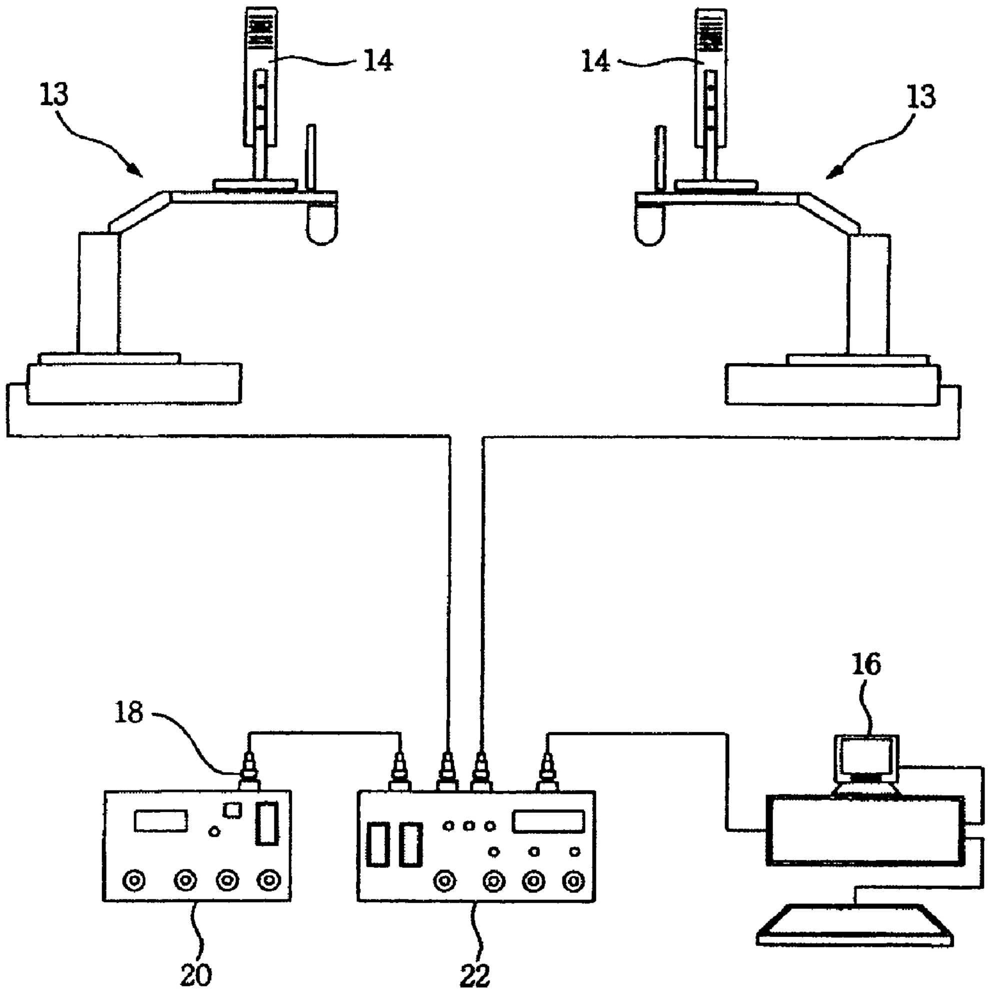
FIG. 1(PRIOR ART)
FIG. 1 is a schematic diagram showing a system for driving an electronic signboard on which basketball game remaining time is displayed.
Figure 2:
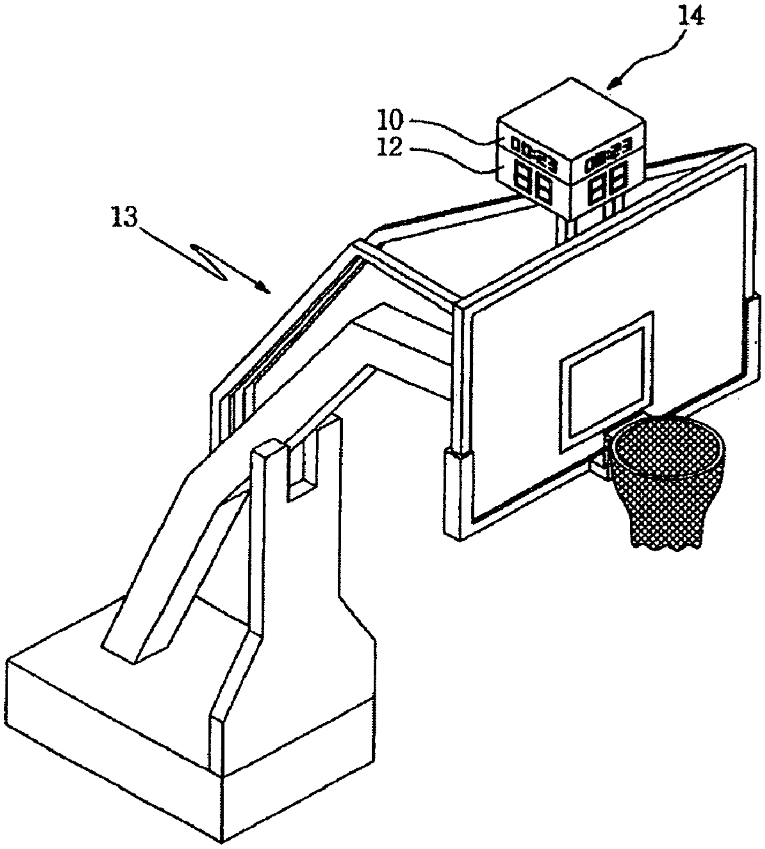
FIG. 2(PRIOR ART)
FIG. 2 is a perspective view showing the electronic signboard of FIG. 1 on which basketball game remaining time is displayed is installed in the upper side of the basketball game post.
Figure 3:
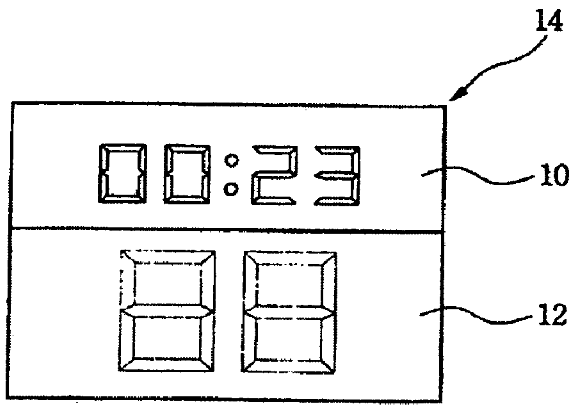
FIG. 3(PRIOR ART)
FIG. 3 is a front view showing an offense limit time display window on the basketball game remaining time display electronic signboard when game time is left less than twenty-four seconds.
Figure 4:
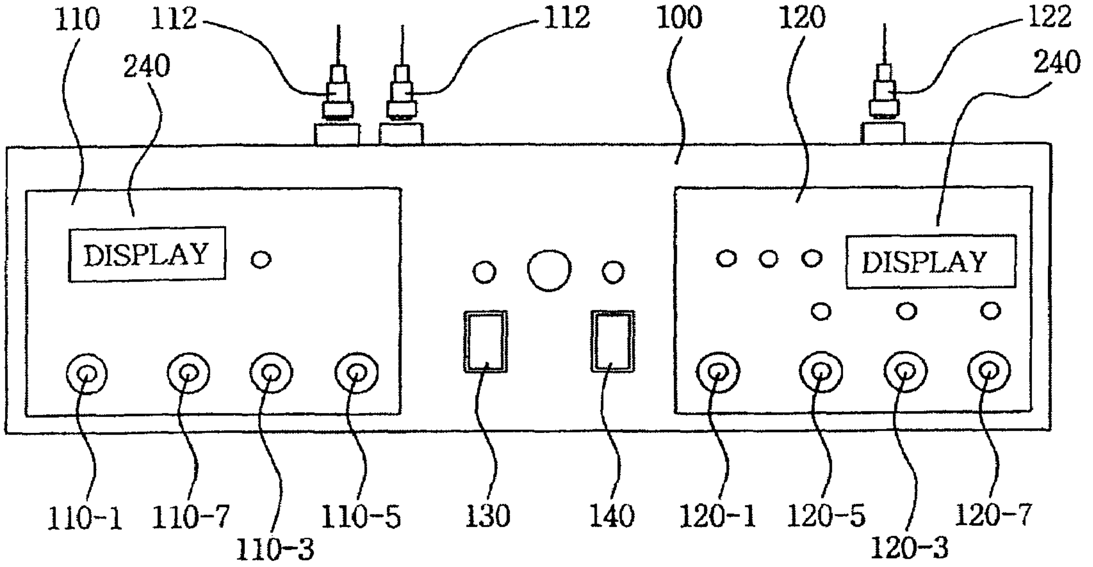
FIG. 4 is a side view schematically showing an outer appearance of a basketball game remaining time controller provided with a controller for controlling a timer for measuring an offense limit time in a basketball game according to the present invention.

FIG. 4 schematically shows an outer appearance of a basketball game remaining time controller provided with a controller for controlling a timer for measuring an offense limit time in a basketball game according to the present invention.

As shown in FIG. 4, a basketball game remaining time controller 100 applied in the present invention includes a basketball game offense limit time timer controller 110 which counts offense limit time and transmits the count signal to an offense limit time display (not shown) provided in a basketball game remaining time electronic signboard (not shown) via a connector 112. The basketball game remaining time controller 100 also includes a game remaining time timer controller 120 which counts game remaining time and transmits the count signal to a game remaining time display (not shown) provided in the basketball game remaining time electronic signboard (not shown) via a connector 122. The basketball game remaining time controller 100 also includes a first on/off switch 130 which turns on or off the basketball game offense limit time timer controller 110, and a second on/off switch 140 which turns on or off the basketball game remaining time timer controller 120.

Here, the basketball game offense limit time timer controller 110 includes a start switch 110-1, a stop switch 110-3, a reset switch 110-5, and a restart switch 110-7.

Also, the game remaining time timer controller 120 includes a buzzer 120-1, a stop switch 120-3, a reset switch 120-5, and a start switch 120-7.

The inner structure of the basketball game remaining time controller 100 having the above-described structure will be described below in more detail with reference to FIGS. 5 and 6.

Figure 5:
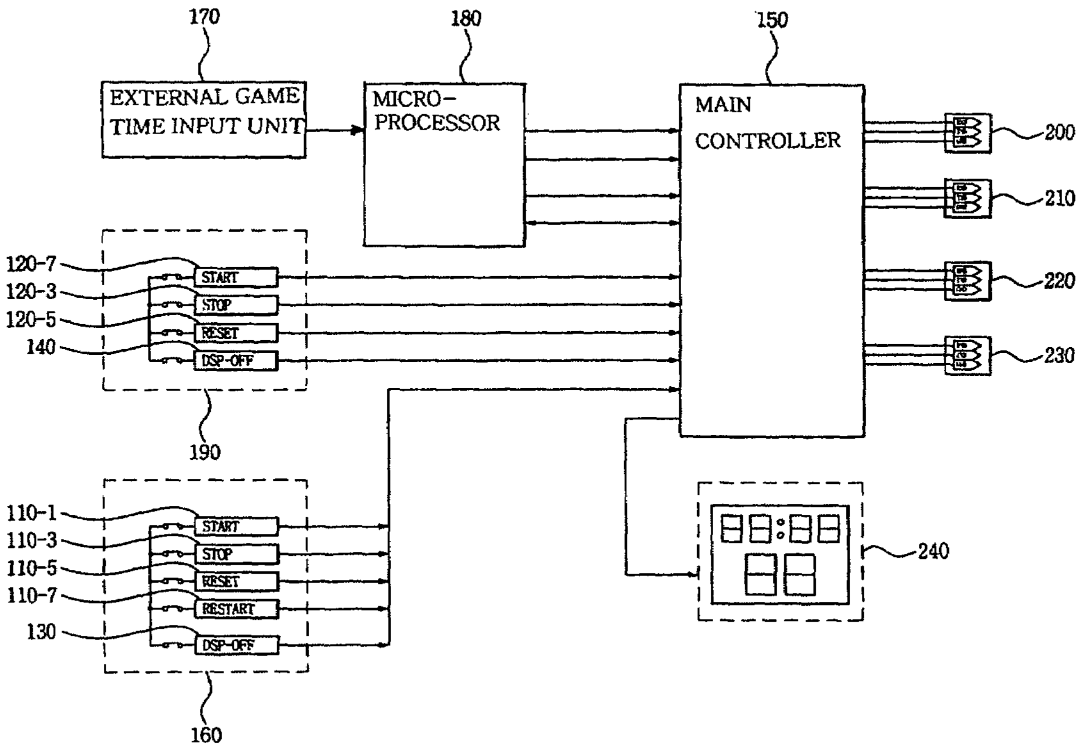
FIG. 5 is a block diagram schematically showing the internal constitution of the controller for controlling a timer for measuring an offense limit time in a basketball game of FIG. 4.
Figure 6:
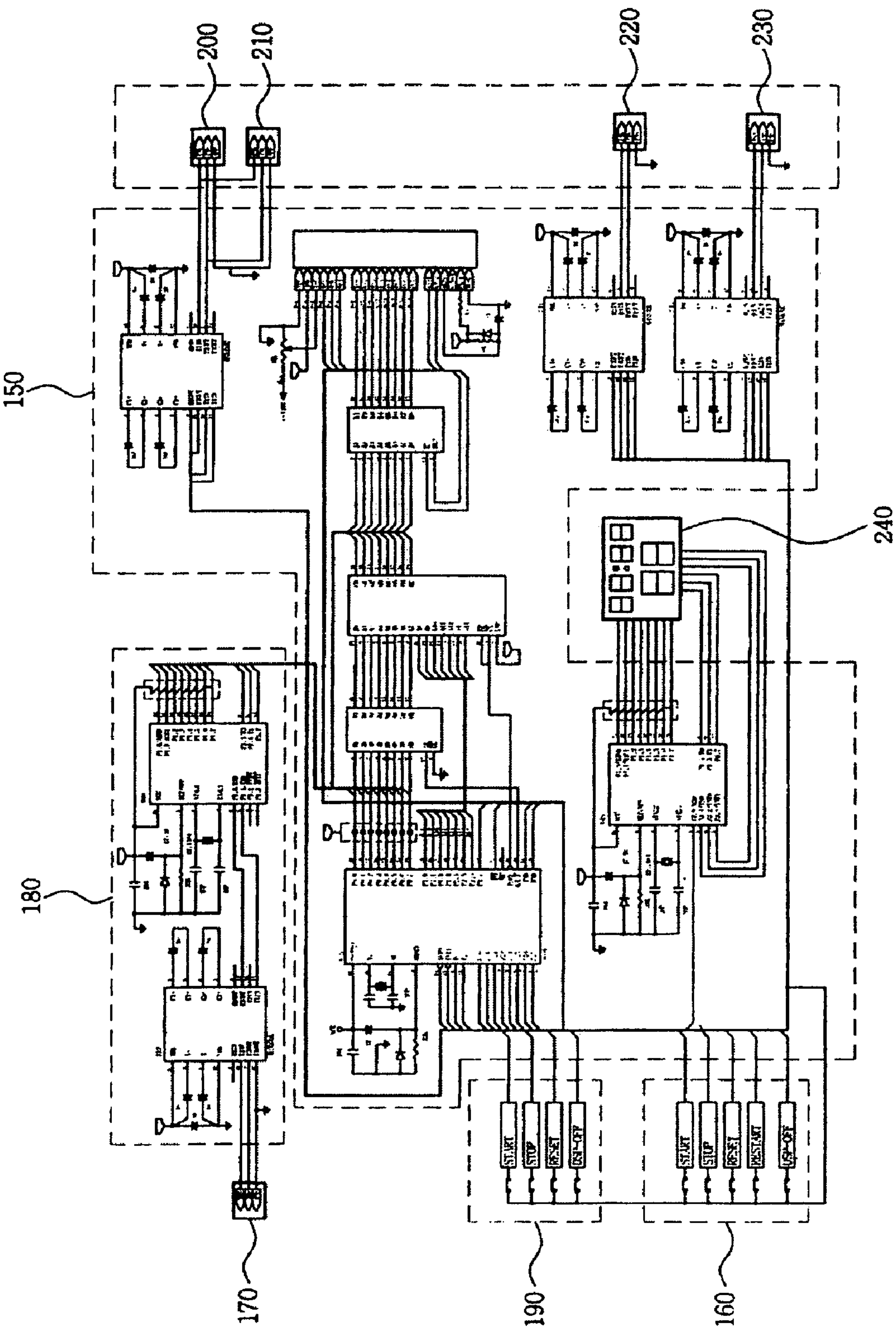
FIG. 6 is a detailed circuit diagram showing the controller for controlling a timer for measuring an offense limit time in a basketball game of FIG. 4.

FIG. 5 is a block diagram schematically showing the internal constitution of the controller for controlling a timer for measuring an offense limit time in a basketball game of FIG. 4, and FIG. 6 is a detailed circuit diagram showing the controller for controlling a timer for measuring an offense limit time in a basketball game of FIG. 4.

As shown in FIGS. 5 and 6, the inner structure of the basketball game remaining time controller 100 includes a main controller 150 controlling all operations of a basketball game-related time controlling system, a switch manipulator 160 provided in the basketball game offense limit time timer controller 110 which transmits offense limit time to the main controller 150 according to switch manipulation, and an external game time input unit 170 provided in the game remaining time timer controller 120 which inputs game time to a microprocessor 180 to be described later. The microprocessor 180 communicates with the main controller 150 and transmits game time, a 1-minute signal, and a 24-second signal all of which are input from the external game time input unit 170 to the main controller 150. The inner structure of the basketball game remaining time controller 100 also includes a game time switch manipulator 190 provided in the game remaining time timer controller 120 which transmits game time manually according to switch manipulation, in the case that game time is not normally input from the microprocessor 180. The inner structure of the basketball game remaining time controller 100 also includes first and second output terminals 200 and 210 which are interfaced with the main controller 150 and transmit game remaining time or offense limit time to basketball game remaining time electronic signboards (not shown) which are positioned in first and second basketball game posts, respectively, according to control signals output from the main controller 150. The inner structure of the basketball game remaining time controller 100 also includes a database output terminal 220 which is interfaced with the main controller 150 and transmits data to a database (not shown) in a game management computer (not shown) positioned in a headquarter, according to a control signal output from the main controller 150, and a broadcasting relay output terminal 230 which is interfaced with the main controller 150 and transmits data to the game management computer (not shown) positioned in the headquarter, according to a control signal output from the main controller 150. The inner structure of the basketball game remaining time controller 100 also includes displays 240 for the basketball game offense limit time timer controller 110 and the game remaining time timer controller 120 which are interfaced with the main controller 150 and display offense limit time and game remaining time according to control signals output from the main controller 150, respectively.

The switch manipulator 160 provided in the basketball game offense limit time timer controller 110 includes a start switch 110-1 which enables offense limit time to be displayed on the display 240, a stop switch 110-3 which stops clock of the offense limit time when game procession is interrupted due to timeouts, break, foul or violation, a reset switch 110-5 which renews the basketball game time controlling system, a restart switch 110-7 which resets offense limit time continuously newly, and a first on/off switch 130 which turns on or off the basketball game offense limit time timer controller 110.

Also, the game time switch manipulator 190 provided in the game remaining time timer controller 120 includes a stop switch 120-3 which stops clock of the game time when game procession is interrupted due to timeouts, break, foul or violation, a reset switch 120-5 which renews the basketball game time controlling system, a start switch 120-7 which enables game time to be displayed on the display 240, and a second on/off switch 140 which turns on or off the game remaining time timer controller 120.

The operation of the basketball game remaining time controller having the above-described structure will be described below with reference to FIGS. 7 and 8.

Figure 7:
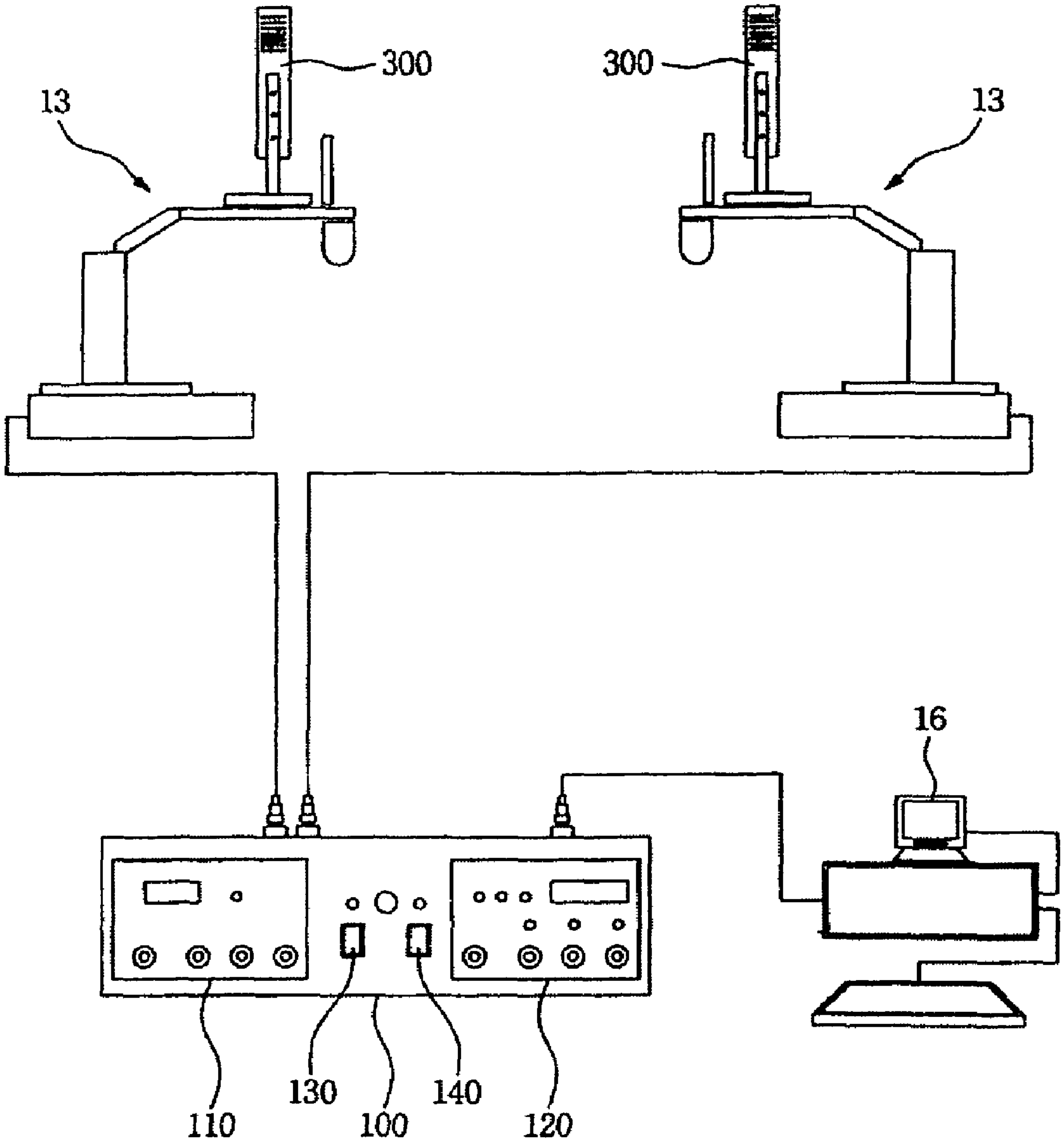
FIG. 7 is a schematic diagram showing a system for driving a basketball game remaining time display electronic signboard to which the present invention is applied.
Figure 8:
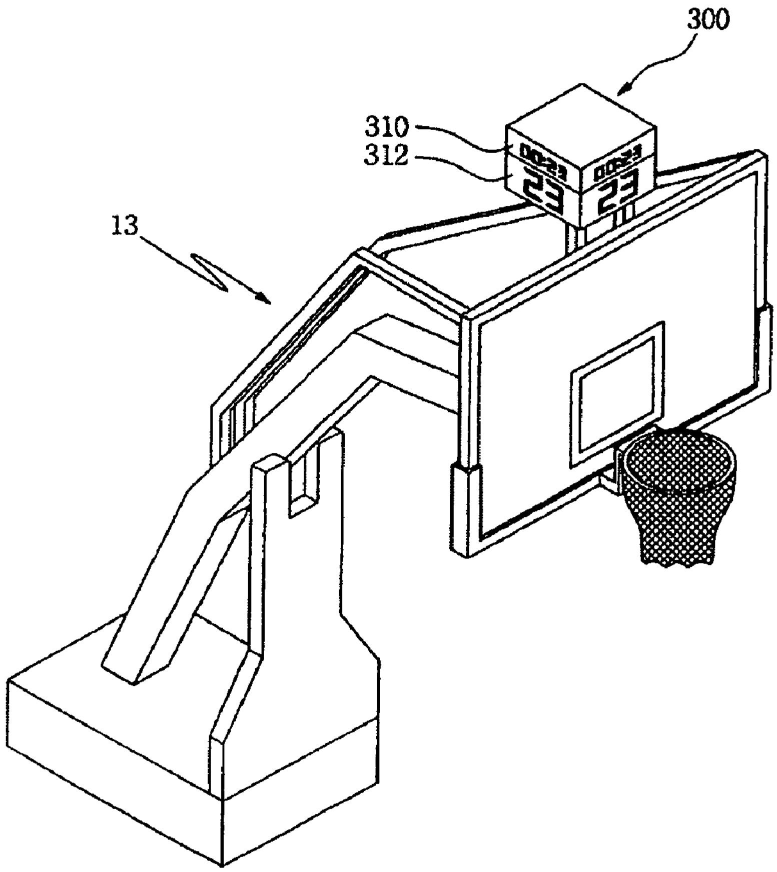
FIG. 8 is a perspective view showing the basketball game remaining time display electronic signboard of FIG. 7 is installed in the upper side of the basketball game post.

FIG. 7 is a schematic diagram showing a system for driving a basketball game remaining time display electronic signboard to which the present invention is applied, and FIG. 8 is a perspective view showing the basketball game remaining time display electronic signboard of FIG. 7 is installed in the upper side of the basketball game post.

First, various information such as introduction of players, scores, and game remaining time, is displayed on the main electronic signboard by the game management computer 16 so that spectators can see the various information displayed on the main electronic signboard.

Also, the game management computer 16 transmits the signal for the game remaining time to the game remaining time display 310 provided in the basketball game remaining time electronic signboard 300 which is installed in the upper portion of the basketball game post 13, via the game remaining time controller 120 provided in the basketball game remaining time controller 100, so that the game remaining time is displayed on the game remaining time display 310 in real-time in synchronization with the main electronic signboard.

Meanwhile, when an operational signal is applied in the offense limit time dedicated controller 110 provided in the basketball game remaining time controller 100, it is transmitted to the main electronic signboard and the offense limit time display 312 provided in the basketball game remaining time electronic signboard 300, respectively, so that the remaining offense limit time can be recognized by both the players and spectators.

To do so, the start switch 110-1 provided in the basketball game offense limit time timer controller 110 is manipulated in order to start offense limit time which is set in the main controller 150.

Accordingly, the main controller 150 transmits offense limit time to the offense limit time displays 312 provided in the basketball game remaining time electronic signboards 300 which are positioned in first and second basketball game posts 13, respectively, via the first and second output terminals 200 and 210.

Thus, the offense limit time is displayed on the offense limit time display 312.

Meanwhile, the main controller 150 judges whether game remaining time which has been set by program so as to be displayed on the game remaining time display 310 provided in the basketball game remaining time electronic signboard 300 is left equal to or more than 24 seconds, or less than 24 seconds.

In the case that the game remaining time is left more than 24 seconds in the judgement result, the main controller 150 allows a switch manipulation input signal in the switch manipulator 160 provided in the basketball game offense limit time timer controller 110.

As a result, the offense limit time is displayed on the offense limit time display 310 provided in the basketball game remaining time electronic signboard 300 according to switch manipulation of the switch manipulator 160 provided in the basketball game offense limit time timer controller 110.

For example, when game remaining time is left one minute, manipulation of the start switch 110-1 starts offense limit time to be displayed. Here, in the case that the stop switch 110-3 is manipulated, offense limit time is operated. In the case that the reset switch 110-5 is manipulated, the basketball game time controlling system is newly reset. In the case that the restart switch 110-7 is manipulated, offense limit time starts to be newly displayed. In the case that the first on/off switch 130 is manipulated, the basketball game time controlling system is turned on or off.

Meanwhile, when game remaining time is left less than 24 seconds in the judgement result in the main controller 150, the main controller 150 intercepts the switch manipulation input signal in the switch manipulator 160 provided in the basketball game offense limit time timer controller 110.

Figure 9:
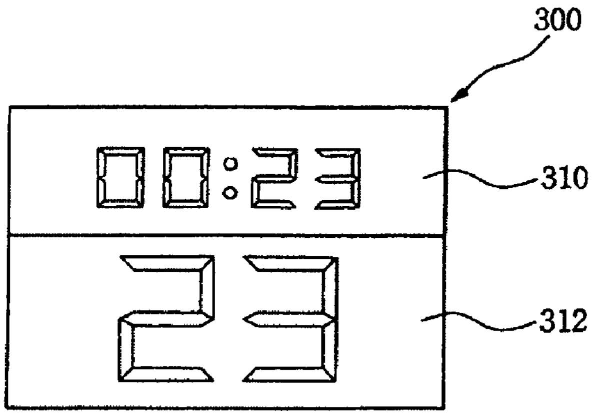
FIG. 9 is a front view showing an offense limit time display window on the basketball game remaining time display electronic signboard when game time is left less than twenty-four seconds.

Accordingly, as shown in FIG. 9, offense limit time is continuously displayed on the offense limit time display 310 provided in the basketball game remaining time electronic signboard 300.

Meanwhile, when the game remaining time is left zero second and the offense limit time is left zero second, the main controller 150 returns to the original normal function.

As described above, a controller for controlling a timer for measuring offense limit time in a basketball game according to the present invention continuously displays offense limit time on an offense limit time display when a game remaining time is left less than twenty-four seconds, to thereby allow players to play the basketball game and spectators to see the basketball game more dynamically as well.

Also, the present invention continuously displays offense limit time on the offense limit time display to thereby allow players and spectators to easily recognize offense limit time.

In particular, the present invention can reduce possibility of making a fault or burden of an operator due to speedy manipulation of the basketball game remaining time controller at the situation that the game remaining time is left impendingly or less than 24 seconds. Thus, the present invention allows an unskilled operator to manipulate the basketball game time controlling system without feeling a large amount of burden.

As described above, the present invention has been described with respect to a particularly preferred embodiment. However, the present invention is not limited to the above embodiments, and it is possible for one who has an ordinary skill in the art to make various modifications and variations, without departing off the spirit of the present invention.

What is claimed is:

1. A controller for controlling a timer for measuring an offense limit time in a basketball game, for use in a game remaining time controller for measuring a game remaining time for use in a game time controlling system including an external game time input unit which inputs game time or offense limit time via a microprocessor, a game time switch manipulator which inputs or stops game time manually at the time when the external game time input unit is out of order, and an offense limit time switch manipulator which inputs or stops offense limit time, so that the measured offense limit time is displayed on an offense limit time display and the measured game remaining time is displayed on a game remaining time display, in a game remaining time electronic signboard, only in the case where the game remaining time left is not less than a predetermined number of seconds the offense limit time timer controller comprising:

a main controller performing the operations of:

operating according to an input signal from the microprocessor, the game time switch manipulator, or the offense limit time switch manipulator;

judging whether the game remaining time is left equal to or more than a predetermined number of seconds, or less than the predetermined number of seconds;

allowing according to the input signal from the microprocessor, the game time switch manipulator and the offense limit time switch manipulator to operate if the game remaining time is left equal to or more than the predetermined number of seconds in the judgment result; and blocking according to the input signal from the microprocessor, the game time switch manipulator to operate, and the offense limit time switch manipulator to not operate if the game remaining time is left less than the predetermined number of seconds in the judgment result; and an output terminal which interfaces with the main controller, and transfers the offense limit time to the offense limit time display in the game remaining time electronic signboard on which the offense limit time is continuously displayed, according to a control signal from the main controller, even in the case that the game remaining time is left less than the predetermined number of seconds.

* * * * *